United States Patent
Enamito et al.

(10) Patent No.: US 12,461,070 B2
(45) Date of Patent: Nov. 4, 2025

(54) INSPECTION APPARATUS AND INSPECTION METHOD

(71) Applicant: KABUSHIKI KAISHA TOSHIBA, Tokyo (JP)

(72) Inventors: Akihiko Enamito, Kawasaki (JP); Tatsuhiko Goto, Kawasaki (JP); Osamu Nishimura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 569 days.

(21) Appl. No.: 17/822,253

(22) Filed: Aug. 25, 2022

(65) Prior Publication Data
US 2023/0258606 A1    Aug. 17, 2023

(30) Foreign Application Priority Data
Feb. 16, 2022    (JP) .................. 2022-022275

(51) Int. Cl.
*G01N 29/12* (2006.01)
*G01N 29/04* (2006.01)
*G01N 29/44* (2006.01)

(52) U.S. Cl.
CPC .......... *G01N 29/12* (2013.01); *G01N 29/045* (2013.01); *G01N 29/4463* (2013.01); *G01N 2291/023* (2013.01); *G01N 2291/0289* (2013.01)

(58) Field of Classification Search
CPC .. G01N 29/12; G01N 29/045; G01N 29/4465; G01N 2291/023; G01N 2291/0289
(Continued)

(56) References Cited

U.S. PATENT DOCUMENTS

| | | |
|---|---|---|
| 5,563,954 A | 10/1996 | Ono et al. |
| 6,728,661 B1 | 4/2004 | Cannelli et al. |

(Continued)

FOREIGN PATENT DOCUMENTS

| | | |
|---|---|---|
| JP | 6-253387 A | 9/1994 |
| JP | 9-229758 A | 9/1997 |

(Continued)

OTHER PUBLICATIONS

Machine Translation of JP 5197717 B2 (Year: 2013).*
(Continued)

*Primary Examiner* — Julian D Huffman
(74) *Attorney, Agent, or Firm* — Oblon, McClelland, Maier & Neustadt, L.L.P.

(57) ABSTRACT

According to one embodiment, an inspection apparatus includes a vibration sensor, a microphone, and a processor. The vibration sensor detects a vibration of an inspection target object to which the vibration is excited. The microphone arranged near the inspection target object and collects a radiated sound from the inspection target object. The processor calculates an impulse response between the vibration sensor and the microphone. The processor denoises an unnecessary component from the impulse response. The processor converts the impulse response into a frequency characteristic. The processor calculates acoustic energy between the vibration sensor and the microphone based on the frequency characteristic. The processor determine the presence/absence of an abnormal state of the inspection target object.

9 Claims, 14 Drawing Sheets

(58) Field of Classification Search
USPC .................................................. 73/579, 655
See application file for complete search history.

(56) References Cited

U.S. PATENT DOCUMENTS

| | | | |
|---|---|---|---|
| 11,570,545 B2 * | 1/2023 | Enamito | ................ H04R 1/245 |
| 2016/0238534 A1 | 8/2016 | Lau et al. | |
| 2019/0017973 A1 * | 1/2019 | Enamito | ................ G01N 29/14 |
| 2019/0285588 A1 * | 9/2019 | Enamito | .............. G01N 29/045 |
| 2023/0258606 A1 * | 8/2023 | Enamito | .............. G01N 29/449 |
| | | | 73/579 |

FOREIGN PATENT DOCUMENTS

| | | | |
|---|---|---|---|
| JP | 2003-503703 A | | 1/2003 |
| JP | 2007-81815 A | | 3/2007 |
| JP | 2009-284097 A | | 12/2009 |
| JP | 2012-107918 A | | 6/2012 |
| JP | 5197717 B2 | * | 5/2013 |
| JP | 2014-228352 A | | 12/2014 |
| JP | 2021-92419 A | | 6/2021 |

OTHER PUBLICATIONS

Japanese Office Action issued Oct. 1, 2024 in Japanese Patent Application No. 2022-022275 (with unedited computer-generated English Translation), 4 pages.

* cited by examiner

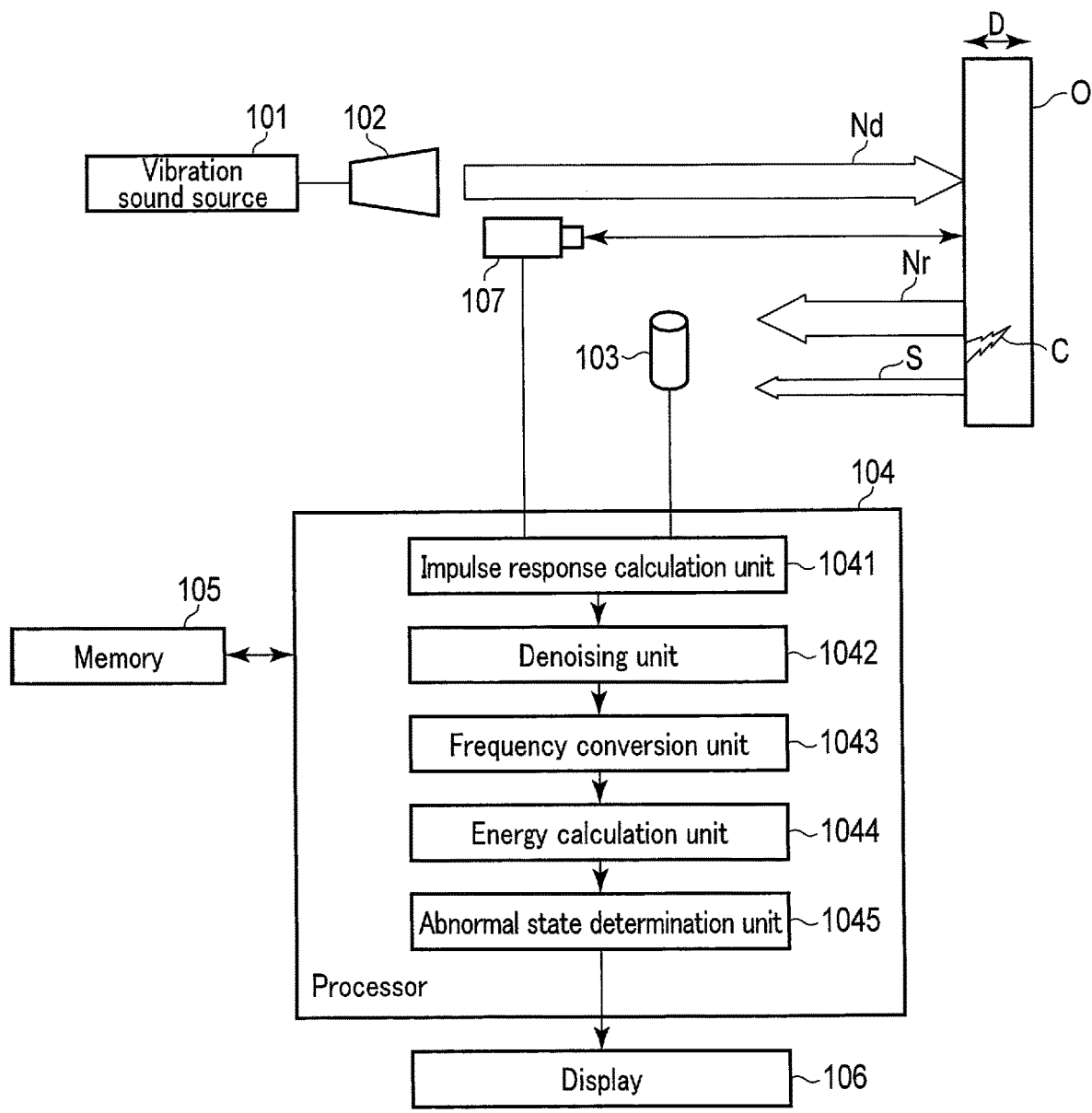
F I G. 1

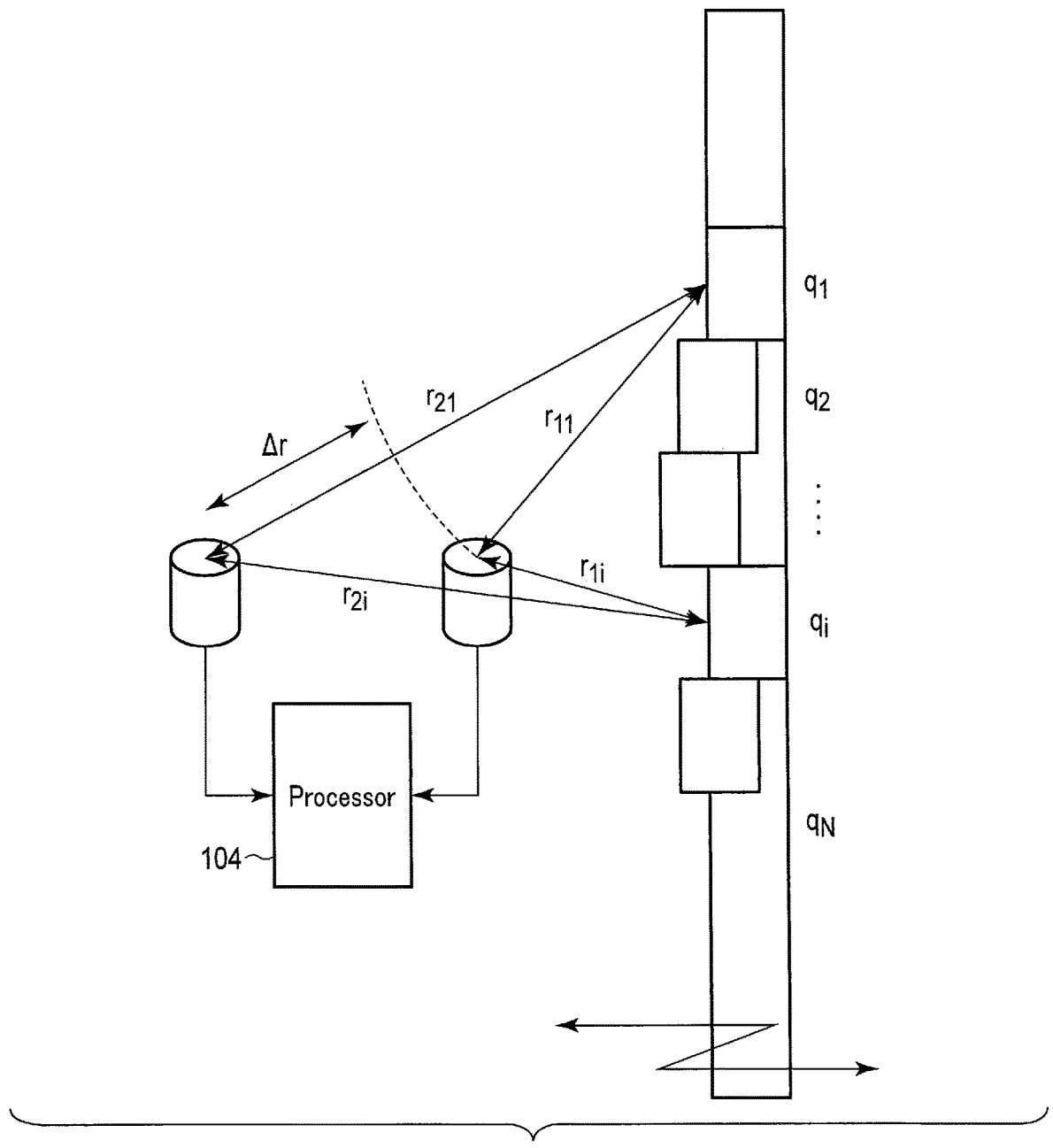
F I G. 3

(A) Point vibration
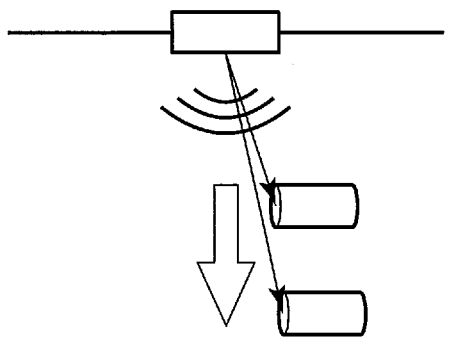
(B) Uniform vibration of entire surface
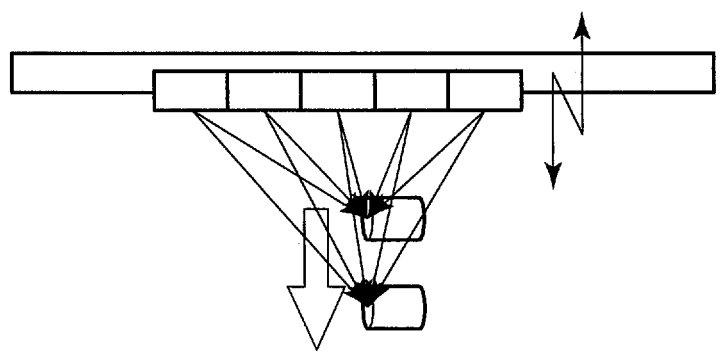
(C) Local vibration
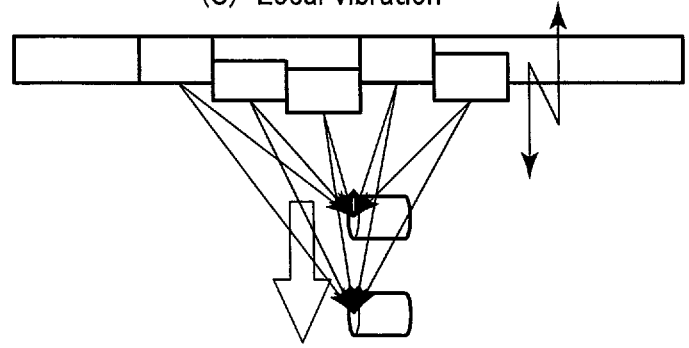
F I G. 5

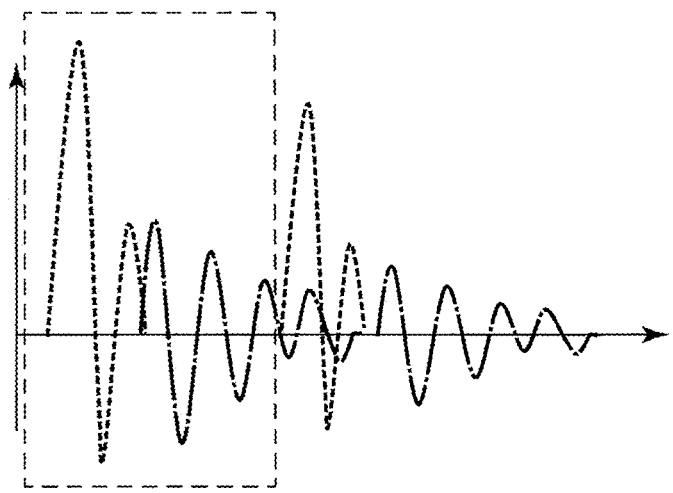
F I G. 14
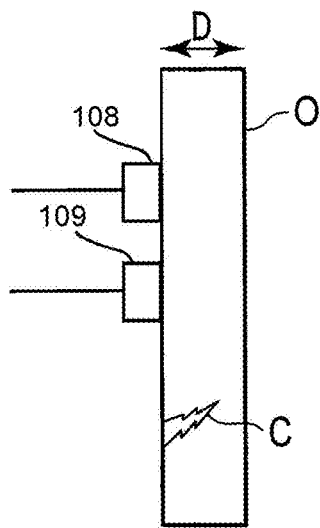
F I G. 15

INSPECTION APPARATUS AND INSPECTION METHOD

CROSS-REFERENCE TO RELATED APPLICATION(S)

This application is based upon and claims the benefit of priority from the Japanese Patent Application No. 2022-022275, filed Feb. 16, 2022, the entire contents of which are incorporated herein by reference.

FIELD

Embodiments described herein relate generally to an inspection apparatus and an inspection method.

BACKGROUND

There has been proposed a technique of nondestructively inspecting an abnormal state such as reduction of an axial force or a crack by applying a physical vibration such as an acoustic wave to an inspection target object and analyzing the behavior of the inspection target object. In this kind of technique, it is possible to detect the presence/absence and location of an abnormal state by vibrating the inspection target object by an acoustic vibration by a speaker, a vibration by a hammering mechanism, or a hammering vibration by a person, and collecting a radiated sound from the inspection target object.

BRIEF DESCRIPTION OF THE DRAWINGS

FIG. 1 is a block diagram showing an example of an inspection apparatus according to an embodiment.

FIG. 3 is a view for explaining the operation principle of the inspection apparatus.

FIG. 5 is a view for explaining different vibration modes.

FIG. 14 is a timing chart showing an example of an impulse response obtained in real time.

FIG. 15 is a diagram illustrating a modification of the inspection apparatus.

DETAILED DESCRIPTION

Figure 2:
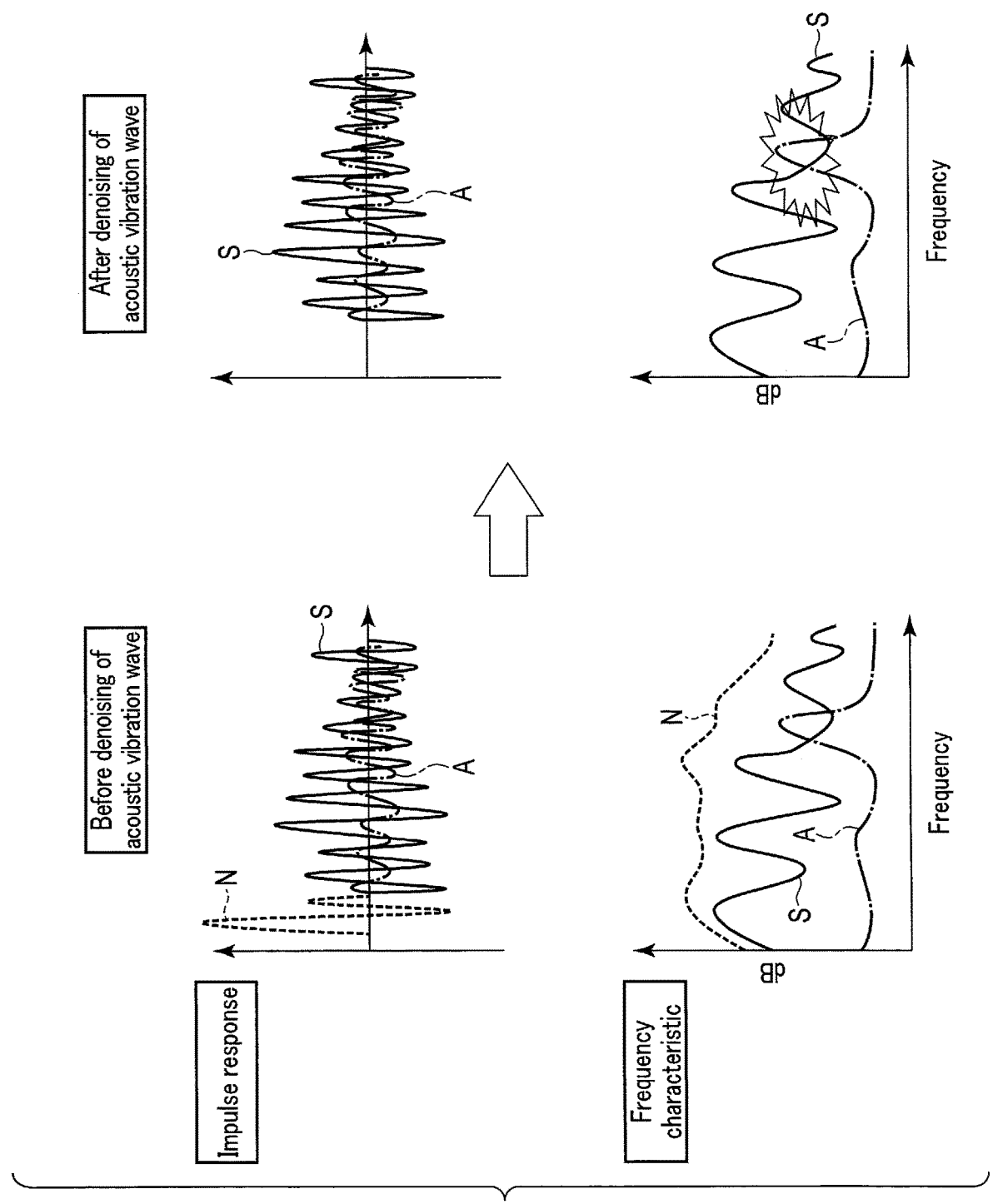
FIG. 2 is a view showing impulse responses and frequency characteristics before and after denoising of a vibration sound.

In general, according to one embodiment, an inspection apparatus includes a vibration sensor, a microphone, and a processor includes hardware. The vibration sensor detects a vibration of an inspection target object to which the vibration is excited. The microphone arranged near the inspection target object and collects a radiated sound from the inspection target object. The processor calculates an impulse response between the vibration sensor and the microphone based on the vibration detected by the vibration sensor and a sound pressure of the radiated sound collected by the microphone. The processor denoises an unnecessary component from the impulse response. The processor converts the impulse response, from which the unnecessary component has been denoised, into a frequency characteristic. The processor calculates acoustic energy between the vibration sensor and the microphone based on the frequency characteristic. The processor determine the presence/absence of an abnormal state of the inspection target object based on the acoustic energy.

An embodiment will be described below with reference to the accompanying drawings.

(Arrangement)

FIG. 1 is a block diagram showing an example of an inspection apparatus according to the embodiment. The inspection apparatus shown in FIG. 1 includes a vibration sound source 101, a speaker 102, a microphone 103, a laser sensor 107, a processor 104, a memory 105, and a display 106. This inspection apparatus inspects the presence/absence of an abnormal state of an inspection target object O by emitting a vibration sound to excite a vibration to the inspection target object O and collecting a radiated sound from the inspection target object O. The abnormal state of the inspection target object O is, for example, a crack C occurring in the inspection target object O.

Note that to excite a vibration to the inspection target object O, there are various methods such as emission of a vibration sound from a speaker, and a hammering vibration by a person or a machine including a hammering mechanism. That is, an acoustic vibration signal may be generated by an arbitrary method. In the embodiment, a method of emitting a vibration sound from a speaker will be exemplified.

Referring to FIG. 1, the vibration sound source 101 as a vibration unit generates an acoustic vibration signal for generating a vibration sound to be emitted to the inspection target object O. The vibration sound may be, for example, a hammering sound at one point.

The speaker 102 is arranged to face the inspection target object O, and emits a vibration sound to the inspection target object O in accordance with the acoustic vibration signal input from the vibration sound source 101. The vibration sound vibrates the inspection target object O in a D direction as a whole, and a radiated sound is radiated from the inspection target object O along with the vibration.

The microphone 103 is arranged near the inspection target object O, for example, at a position of 2.5 cm from the inspection target object O. The microphone 103 collects the radiated sound from the inspection target object O, converts the collected radiated sound into an electrical signal, and outputs the electrical signal to the processor 104.

The laser sensor 107 is a noncontact vibration sensor such as LDV (Laser Doppler Vibrometer), and is arranged at an arbitrary interval from the microphone 103. The laser sensor 107 irradiates the inspection target object O with a laser beam, measures the vibration of the inspection target object O based on a Doppler shift of the reflected laser beam, and generates a vibration measurement signal.

The processor 104 is a processor that includes a digital signal processor such as a CPU, an ASIC, an FPGA, or a DSP, and performs various processes associated with the inspection apparatus. The processor 104 may be formed by a single CPU or the like or by a plurality of CPUs or the like. The processor 104 operates as an impulse response calculation unit 1041, a denoising unit 1042, a frequency conversion unit 1043, an energy calculation unit 1044, and an abnormal state determination unit 1045 by executing, for example, an acoustic inspection program stored in the memory 105.

The impulse response calculation unit 1041 samples each of an acoustic signal collected via the microphone 103 and a vibration measurement signal output from the laser sensor 107 in accordance with a sampling frequency, and analog-digital converts (AD-converts) each signal into digital inspection data. The impulse response calculation unit 1041 calculates an impulse response between the microphone 103 and the laser sensor 107 by performing digital calculation processing based on the vibration measurement signal (digital data) of the vibration collected via the laser sensor 107 and the sound pressure (digital data) of the radiated sound collected via the microphone 103. For example, the impulse response calculation unit 1041 calculates the impulse response by adaptive identification processing using a convolution operation.

The denoising unit 1042 extracts a component of a vibration radiated sound S along with the vibration of the crack C of the inspection target object O by denoising a component of a vibration sound N as an unnecessary component from the impulse response calculated by the impulse response calculation unit 1041.

FIG. 2 shows impulse responses and frequency characteristics before and after denoising of the vibration sound. As shown in FIG. 2, the impulse response collected by the impulse response calculation unit 1041 includes the component (a dotted line) of the vibration sound N, the component (a solid line S) of the vibration radiated sound S, and the component (a one-dot dashed line) of a weak vibration radiated sound A. Therefore, a frequency characteristic calculated based on the impulse response also includes the frequency characteristic of the vibration sound N, the frequency characteristic of the vibration radiated sound S, and the frequency characteristic of the weak vibration radiated sound A.

The weak vibration radiated sound A along with the vibration of the crack C of the inspection target object O is smaller than the vibration sound N. That is, the vibration sound N is necessary to excite the vibration radiated sound S but is noise unnecessary to determine the abnormal state of the inspection target object O. Thus, the denoising unit 1042 denoises the component of the vibration sound N as noise from the impulse response.

The vibration sound N collected by the microphone 103 includes a component of a direct wave Nd from the speaker 102 and a component of a reflected wave Nr from the inspection target object O. The component of the direct wave Nd can be denoised by setting of the microphone 103 or adaptive identification processing. On the other hand, the component of the reflected wave Nr from the inspection target object O can be denoised by, for example, detecting the maximum peak of the impulse response, and denoising a component in a predetermined time width including the maximum peak of the impulse response, that is, a component for the sampling number corresponding to the time width.

The denoising unit 1042 performs processing of denoising the component in the predetermined time width including the maximum peak of the impulse response. As indicated by the impulse response in FIG. 2, reverberation of the vibration radiated sound S is longer than the vibration sound N (=Nd+Nr). Therefore, by denoising the component in the predetermined time width from the impulse response, the frequency characteristic calculated based on the impulse response output from the denoising unit 1042 includes only the frequency characteristic of the vibration radiated sound S. Since the frequency characteristic of the vibration radiated sound is different between the presence of the abnormal state and the absence of the abnormal state, the presence/absence of the abnormal state can be determined based on the difference.

The frequency conversion unit 1043 converts the impulse response output from the denoising unit 1042 into the frequency characteristic. For example, the frequency conversion unit 1043 converts the impulse response into the frequency characteristic using FFT (Fast Fourier Transformation).

The energy calculation unit 1044 calculates the acoustic energy (average acoustic energy) between the microphone 103 and the laser sensor 107 based on the gain of the entire region in the frequency characteristic output from the frequency conversion unit 1043.

Based on the acoustic energy calculated by the energy calculation unit 1044, the abnormal state determination unit 1045 determines the presence/absence of an abnormal state in the inspection target object O and the degree of progress of the abnormal state if it exists. For example, the abnormal state determination unit 1045 stores an acoustic energy threshold when there exists the abnormal state in an inspection target object similar to the inspection target object O. The abnormal state determination unit 1045 determines the presence/absence of the abnormal state by comparing, with the threshold, the acoustic energy calculated by the energy calculation unit 1044. Similarly, the abnormal state determination unit 1045 stores the acoustic energy threshold when the abnormal state progresses in an inspection target object similar to the inspection target object O. The abnormal state determination unit 1045 determines the degree of progress of the abnormal state by comparing, with the threshold, the acoustic energy calculated by the energy calculation unit 1044.

The memory 105 includes a ROM and a RAM. The ROM stores various programs such as an activation program of the inspection apparatus and the acoustic inspection program to be executed by the processor 104. The RAM can be used as a work memory when the processor 104 performs various calculation operations and the like.

The display 106 is a display such as a liquid crystal display or an organic EL display, and displays various kinds of images. For example, the display 106 displays the determination result of the presence/absence of the abnormal state and the degree of progress of the abnormal state by the abnormal state determination unit 1045.

The operation of the inspection apparatus according to the embodiment will be described next. The operation principle of the inspection apparatus will first be described.

FIG. 3 is a view for explaining the operation principle of the inspection apparatus. The principle when two microphones (first microphone and second microphone) are used will first be described. When a structure with a crack is vibrated, new resonance occurs near a high-order local vibration around the crack. If a divided vibration of a portion around the crack locally occurs by the vibration, the portion has a local, discontinuous, and asymmetrical vibration field unlike a mode vibration by normal plate resonance. Assuming the vibration field as a small divided vibration, the vibration can be regarded as a model in which a plurality of small elements (several mm) on the surface of the inspection target object O shown in FIG. 3 are distributed on a two-dimensional flat plate and vibrate at different complex amplitudes.

It is understood that if the vibration radiated sound is collected using the two microphones, a transfer function G between the microphones is a function of a complex vibration amplitude αi between elements of divided vibrations and a coefficient βi by a propagation path ratio associated with a distance r from the position of the sound source for generating the divided vibration radiated sound, that is, the divided element to the microphone.

If the element readily vibrates due to a difference in the degree of degradation (the depth of the crack), as the vibration displacement, velocity, and vibration volume velocity qi (=vibration velocity×element area) increase, αi increases. The volume velocity qi can be expressed by a ratio with respect to q1, thereby obtaining qi=αiq1. Depending on the size and progress of the degradation, the radiation position of the radiated sound also changes and βi thus changes. Therefore, based on the change of the transfer function G between the two microphones, a vibration generated by applying an acoustic vibration to the degraded portion can be measured.

The transfer function G (impulse response) between the two microphones is given by equation (1) below. In equation (1), * (asterisk) is a symbol representing a complex conjugate.

$$G = \frac{P2 \cdot P1*}{P1 \cdot P1*} \quad (1)$$

Figure 4:
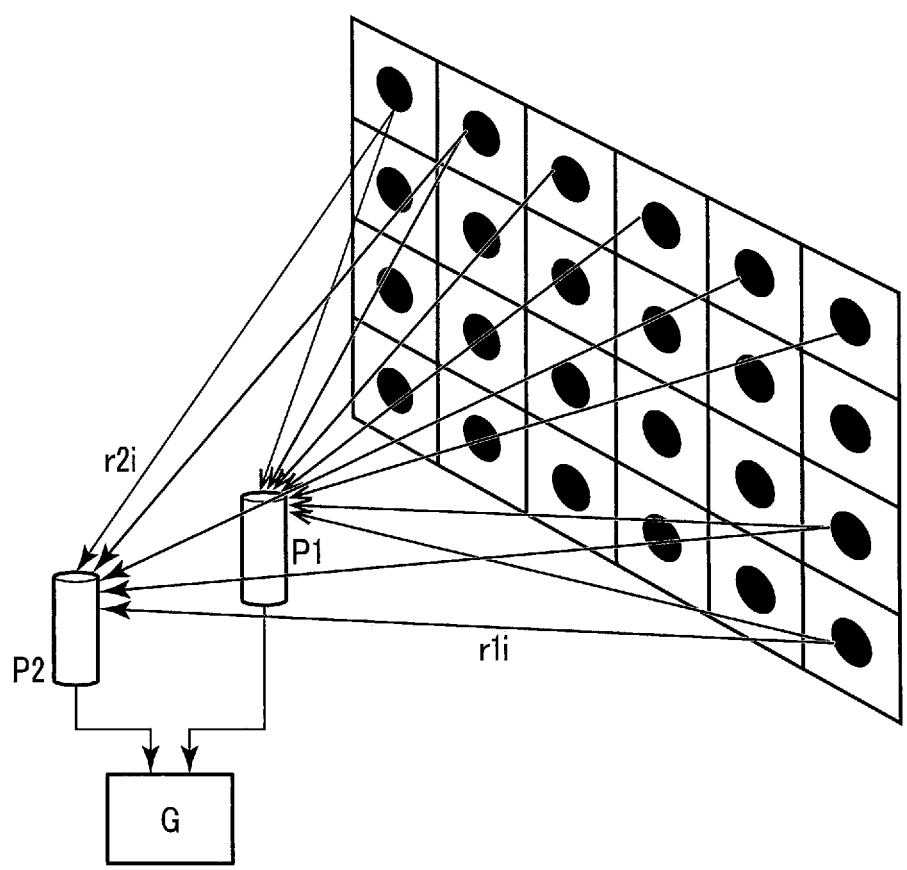
FIG. 4 is a view for explaining a sound pressure of each of a plurality of microphones.

As shown in FIG. 4, r1i represents the distance from a vibration element Ei to the first microphone, r2i represents the distance from the vibration element Ei to the second microphone, P1 represents a sound pressure of the first microphone, and P2 represents a sound pressure of the second microphone. When qi represents the volume velocity (=vibration velocity vi of vibration element Ei×area si of vibration element Ei) of the vibration element Ei, P1 and P2 are given by equations (2) below.

$$P1 = \sum_{i=1}^{N} \frac{e^{-jkr1i}}{r1i} qi$$

$$P2 = \sum_{i=1}^{N} \frac{e^{-jkr2i}}{r2i} qi \quad (2)$$

FIG. 5 is a view for explaining different vibration modes, in which (A) shows a point vibration, (B) shows a uniform vibration of the entire surface, and (C) shows a local vibration. In a general vibration field where there is no crack, the transfer function G between the microphones when a point vibration source is used or when the entire surface uniformly vibrates is given by:

$$\alpha_i = 1 \quad i = 1, 2, \ldots N \quad (3)$$

$$\therefore G = \frac{r_{11}}{r_{21}} e^{-jk\Delta r} \frac{1 + \sum_{i=2}^{N} \beta_{2i}}{1 + \sum_{i=2}^{N} \beta_{1i}}$$

As indicated by equation (3), since the transfer function G between the two microphones includes no vibration information qi, it is impossible to detect the radiated sound.

The transfer function G between the microphones when the microphones are moved away from the target portion is given by:

$$\Delta r_{2i} = r_{2i} - r_{21} \cong 0 \quad (4)$$

$$\Delta r_{1i} = r_{1i} - r_{11} \cong 0$$

$$\therefore \beta_{2i} \cong 1$$

$$\beta_{1i} \cong 1$$

$$\therefore G \cong \frac{r_{11}}{r_{21}} e^{-jk\Delta r}$$

As indicated by equation (4), since no vibration information qi is included in this case as well, it is impossible to detect the radiated sound.

On the other hand, in the case of the local vibration shown in (C) of FIG. 5, it is possible to detect irregular local radiation since no regular vibration mode radiation is performed. That is, as indicated by equations (5) below, it is important that there is a difference in a propagation distance ri from each portion to the microphone. That is, in a vibration generated by vibrating the cracked portion, the difference in the propagation distance ri, to the microphone, from each portion vibrating at the volume velocity qi (amplitude phase) which is locally different produces the effect. Therefore, it is possible to detect the radiated sound.

$$\Delta r_{2i} = r_{2i} - r_{21} \neq 0$$

$$\Delta r_{1i} = r_{1i} - r_{11} \neq 0 \quad (5)$$

Figure 6:
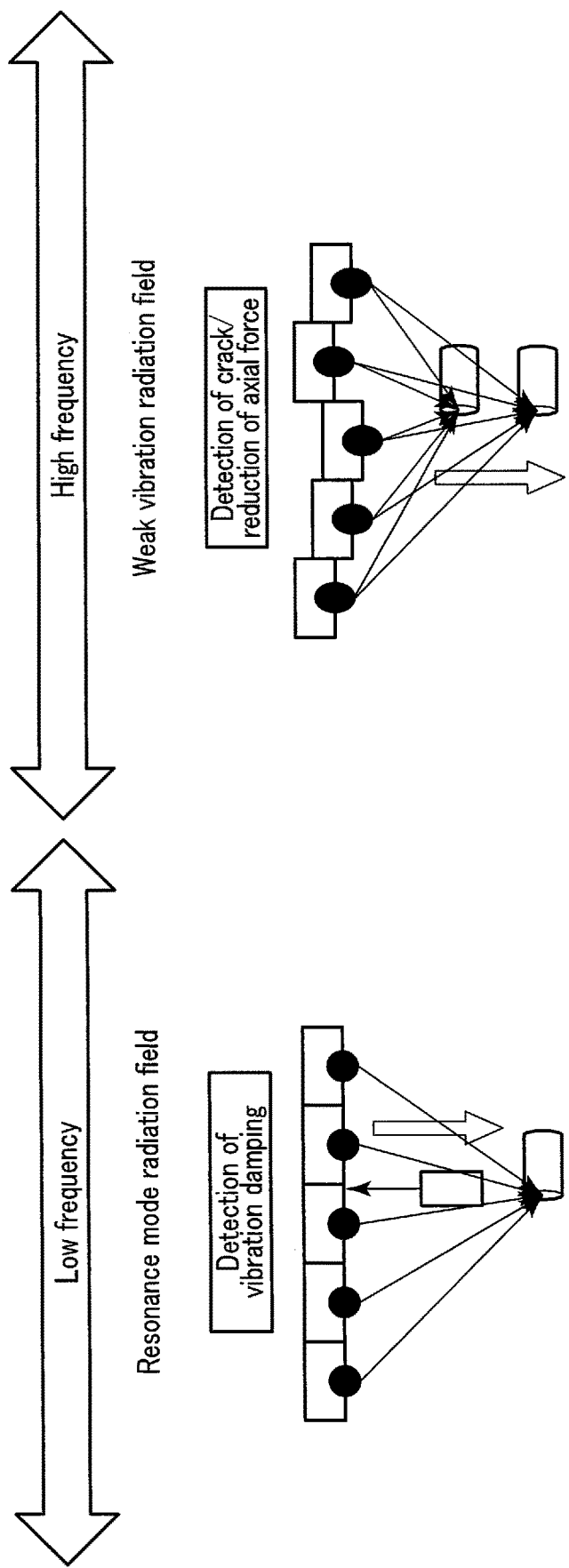
FIG. 6 is a view for explaining the difference between low frequency resonance and high frequency resonance.

FIG. 6 is a view for explaining the difference between low frequency resonance and high frequency resonance. The local vibration shown in (C) of FIG. 5 corresponds to high frequency resonance. In the high frequency resonance, a variance in the amplitude of each element of the divided vibration is large. Furthermore, in the high frequency resonance, the difference in the distance from each element of the divided vibration to the microphone readily causes a phase shift, thereby causing sound pressure interference. In either of the vibrations, it is easy to detect the radiated sound by the two microphones, resonance caused by a crack or reduction of an axial force corresponds to this case.

Equations (6) below each represent a difference in the distance from each element of the divided vibration to the microphone.

$$\Delta r = r_{21} - r_{11}$$

$$\Delta r_{2i} = r_{2i} - r_{21}$$

$$\Delta r_{1i} = r_{1i} - r_{11} \quad (6)$$

Equations (7) below each represent a coefficient that changes on the vibration radiated surface.

$$\beta_{2i} = \frac{r_{21}}{r_{2i}} e^{-jk\Delta r_{2i}} \quad (7)$$

$$\beta_{1i} = \frac{r_{11}}{r_{1i}} e^{-jk\Delta r_{1i}}$$

Equation (8) below represents the transfer function G in the high frequency resonance.

$$G = \frac{r_{11}}{r_{21}} e^{-jk\Delta r} \frac{1 + \sum_{i=2}^{N} \alpha_i \beta_{2i}}{1 + \sum_{i=2}^{N} \alpha_i \beta_{1i}} \quad (8)$$

On the other hand, since the low frequency resonance is such resonance that the overall structure resonates, and a variance between the elements of the divided vibration is small, sound pressure interference is difficult to occur by the incoming sound pressure. Therefore, for example, it is difficult to obtain information by detecting, using two microphones, degradation of the vibration damping property based on the low frequency resonance.

To cope with this, in the embodiment, instead of the two microphones, as shown in FIG. 1, the microphone 103 that obtains the overall vibration information and the laser sensor 107 that obtains local vibration information individually perform measurement, thereby measuring the transfer function of the radiated sound pressure from the vibration of the vibration element irradiated with the laser beam to the microphone 103.

Figure 7:
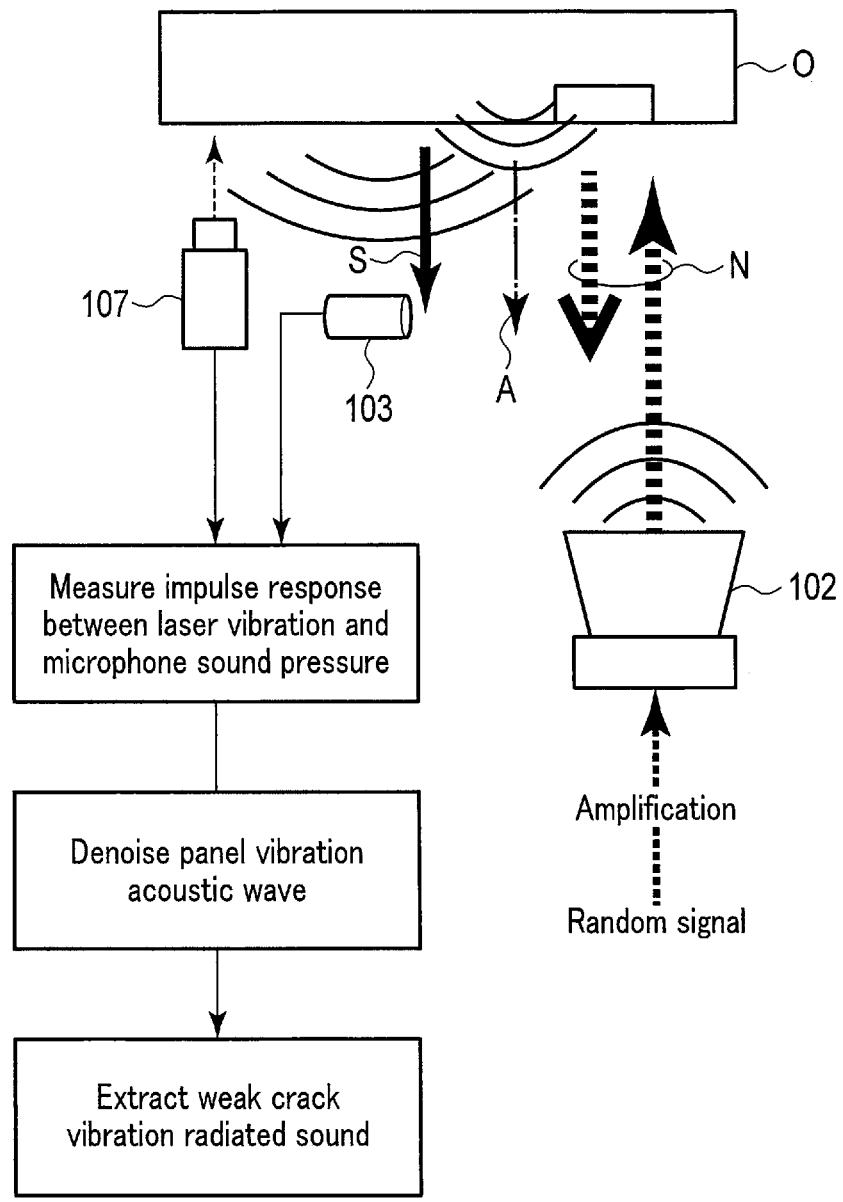
FIG. 7 is a view for explaining the operation principle of the inspection apparatus shown in FIG. 1.

FIG. 7 is a view for explaining the operation principle of the inspection apparatus shown in FIG. 1. Referring to FIG. 7, a random signal such as white noise is amplified by an amplifier, thereby emitting the vibration sound N from the speaker 102. A cracked panel (inspection target object O) irradiated with the vibration sound N is vibrated to emit the vibration radiated sound S. If there is a crack, the weak vibration radiated sound A is also generated. The vibration radiated sound S and the weak vibration radiated sound A are collected by the microphone 103 and converted into an electrical signal.

On the other hand, the laser sensor 107 measures the vibration of the surface of the inspection target object O, thereby acquiring a vibration measurement signal. Then, the impulse response (vibration radiation transfer function) between the microphone 103 and the laser sensor 107 is measured. The buried weak vibration radiated sound A is extracted by denoising the panel acoustic vibration wave (vibration sound N) as an unnecessary component from the impulse response, and then it is possible to diagnose the presence/absence of a weak vibration generated by the crack based on the frequency characteristics of a wide band region.

When a vibration sound is emitted to the inspection target object O, the inspection target object O vibrates in the D direction as a whole (FIG. 1). At this time, a portion of the inspection target object O where there is no abnormal state, for example, there is no crack C uniformly vibrates in the D direction. On the other hand, with respect to a portion of the crack C, as shown in FIG. 3, a portion of the crack C and its periphery have a local, discontinuous, and asymmetrical vibration field unlike the mode vibration of the remaining portion by plate resonance.

The vibration caused by the crack C is represented by a model in which many vibration elements Ei (i=1, 2, ..., N) of several mm are distributed on a two-dimensional flat plate and each vibration element Ei vibrates at a different complex amplitude, as shown in FIG. 4. The inspection apparatus according to the embodiment detects the radiated sound based on the vibration of such model. Therefore, the inspection apparatus according to the embodiment detects the radiated sound from the inspection target object O by the microphone 103 and directly detects the vibration of the inspection target object O by the laser sensor 107.

Figure 8:
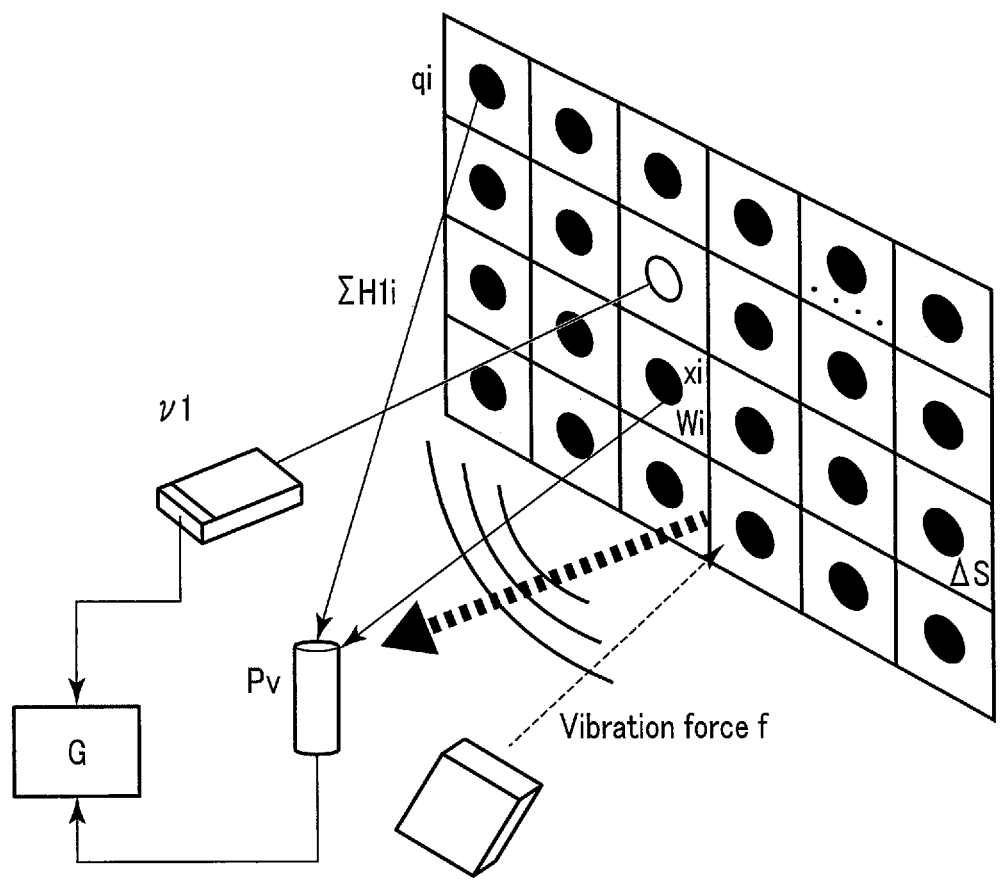
FIG. 8 is a view for further explaining the operation principle of the inspection apparatus shown in FIG. 1.

FIG. 8 is a view for further explaining the operation principle of the inspection apparatus shown in FIG. 1.

Referring to FIG. 8, when F represents a vibration force, v1 represents a measured value by the laser sensor, and Pv represents a microphone sound pressure, the relationship among the parameters is given by:

microphone sound pressure: $P = \Sigma P_i \quad P_i = H_i \cdot F$

Pi: vibration radiated sound pressure from vibration portion i transferred to microphone Hi: transfer function of microphone sound pressure and vibration force F portion vibration velocity $v_i = W_i \cdot F$ Wi: transfer function of vibration velocity and vibration force F volume velocity of portion vibration radiated sound
$q_i = v_i \cdot S_i$ Si: portion area microphone sound pressure $P_i = h_i \cdot q_i$ gi: spatial transfer function from portion i to microphone $$\therefore P_i = g_i \cdot W_i \cdot S_i \cdot F = H_i \cdot F \quad S_i = \Delta S \text{ (divided element area)} \quad (9)$$

Equations (10) below represent the impulse response G including the acoustic vibration wave (vibration sound N) and a microphone sound pressure PR of the acoustic vibration wave (vibration sound N).

$$G = \frac{P_R + P_v}{v1} \quad P_R = \frac{\rho j\omega}{4\pi d} q \cdot e^{-jkd} \quad (10)$$

Equation (11) below represents the panel vibration radiated sound Pv at the position of the microphone 103.

$$P_v = \frac{\rho j\omega \Delta S}{2\pi} \sum_{i=1}^{N} \frac{vi}{ri} e^{-jkri} \quad (11)$$

$$= \frac{\rho j\omega \Delta S}{2\pi} \sum_{i=1}^{N} \frac{j\omega \sum_{n=1}^{\infty} \frac{\varphi_n(xi)\varphi_n(\delta)f}{m_n(\omega_n^2 - \omega^2 + 2j\omega_n\omega\Xi)}}{ri} e^{-jkri}$$

Equation (12) below represents the impulse response G obtained by denoising the acoustic vibration wave (vibration sound N).

$$G = \frac{P_V}{v1} = \frac{\rho j\omega \Delta S}{2\pi v1} \sum_{i=1}^{N} \frac{vi}{ri} e^{-jkri} \quad (12)$$

Assuming that in equation (12), a n-order resonance damping rate ξ is constant, and the damping rate is different between the overall panel and the laser vibration portion (rear dispersion control), equation (13) below is obtained.

$$G = \frac{P_V}{v1} = \frac{\frac{\rho j\omega \Delta S}{2\pi} \sum_{i=1}^{N} \frac{(j\omega(\varphi_n(xi)\varphi_n(\delta)f)/(m_n(2j\omega_n\omega\xi_p)))}{ri} e^{-jkri}}{j\omega \frac{\varphi_n(xv)\varphi_n(\delta)f}{m_n(2j\omega_n\omega\xi_V)}} \quad (13)$$

$$= \frac{\rho j\omega \Delta S}{2\pi \varphi_n(xv)} \frac{\xi_V}{\xi_P} \sum_{i=1}^{N} \frac{\varphi_n(xi)}{ri} e^{-jkri} = U_\gamma \quad \gamma = \frac{\xi_V}{\xi_P}$$

(Effect)

Figure 9:
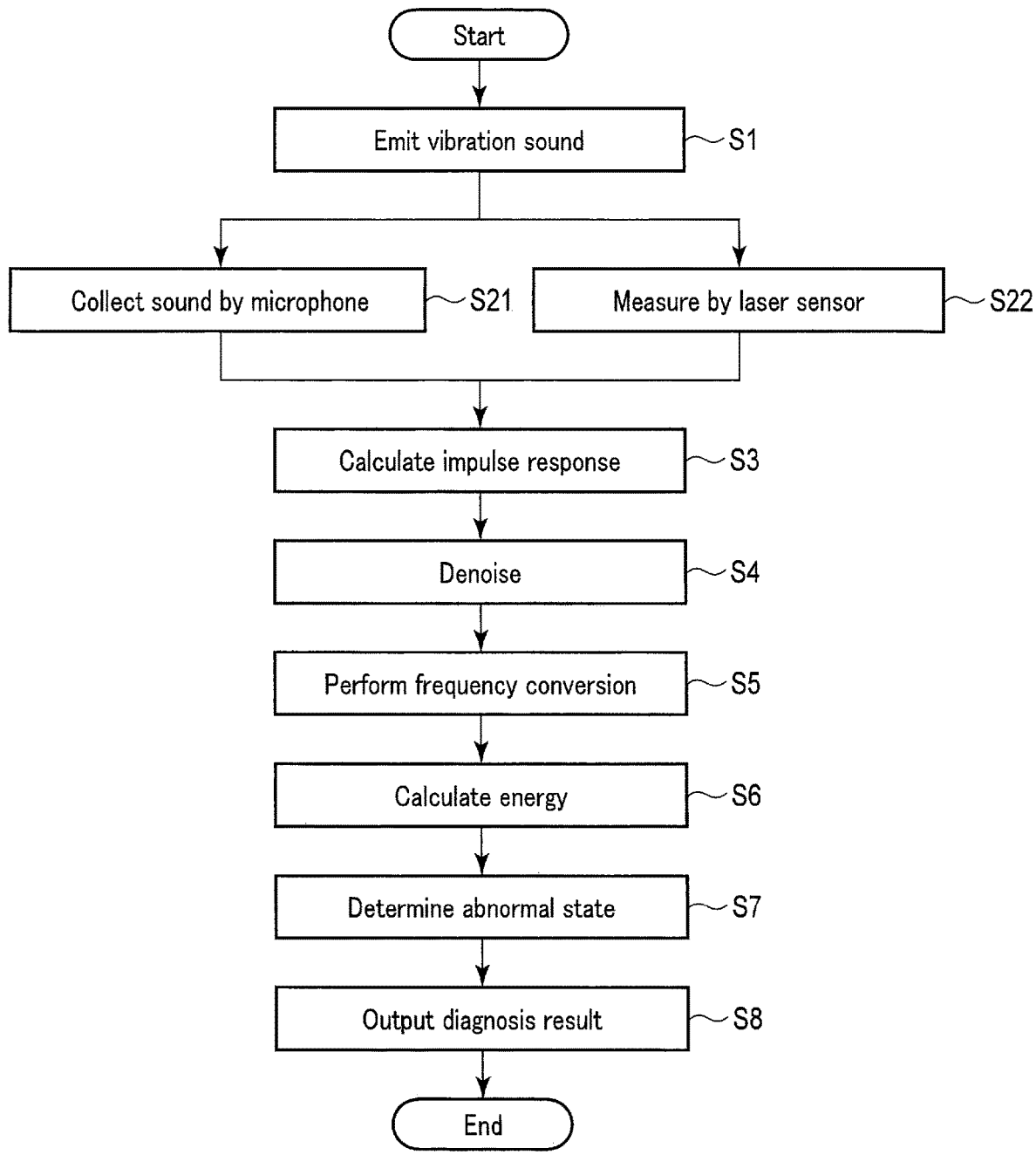
FIG. 9 is a flowchart illustrating an example of the processing procedure of the inspection apparatus according to the embodiment.

FIG. 9 is a flowchart illustrating an example of the processing procedure of the inspection apparatus according to the embodiment. Processing shown in FIG. 9 is mainly executed by the processor 104.

In step S1, the vibration sound source 101 emits a vibration sound to the inspection target object O.

In step S21, the microphone 103 collects the sound.

In step S22, the laser sensor 107 measures the vibration of the surface of the inspection target object O.

In step S3, the processor 104 calculates an impulse response between the microphone 103 and the laser sensor 107 based on the sound pressure of the acoustic signal collected by the microphone 103 and the vibration measurement signal acquired by the laser sensor 107.

In step S4, the processor 104 denoises the component of the vibration sound from the calculated impulse response.

In step S5, the processor 104 converts the impulse response, from which the component of the vibration sound has been denoised, into a frequency characteristic by, for example, FFT.

In step S6, the processor 104 calculates the average acoustic energy between the microphone 103 and the laser sensor 107 from the frequency characteristic.

In step S7, the processor 104 determines the presence/absence of an abnormal state in the inspection target object O and the degree of progress of the abnormal state by, for example, comparing the calculated average acoustic energy with the threshold.

In step S8, the processor 104 outputs, as the diagnosis result of the abnormal state, the determination result of the presence/absence of the abnormal state and the degree of progress of the abnormal state to, for example, the display 106.

The laser sensor 107 measures a vibration at one point on the panel, and thus cannot always acquire the vibration caused by degradation such as a small crack locally generated on the panel vibration surface. To diagnose the presence/absence of the abnormal state only by the laser sensor 107, a mechanism of scanning the overall panel by the laser sensor 107 is required. When a contact type acceleration sensor is used, it is also essential to perform measurement at many point to diagnose the presence/absence of an abnormal state.

To achieve this, in this embodiment, the impulse response between two points of the laser vibration and the microphone sound pressure is measured. Then, vibration information of a region wider than one point acquired by the laser can be reproduced by denoising the acoustic vibration wave as the maximum peak from the impulse response. This makes it possible to detect a weak vibration that is difficult to acquire by measurement at one point by the laser.

(Effect)

Figure 10:
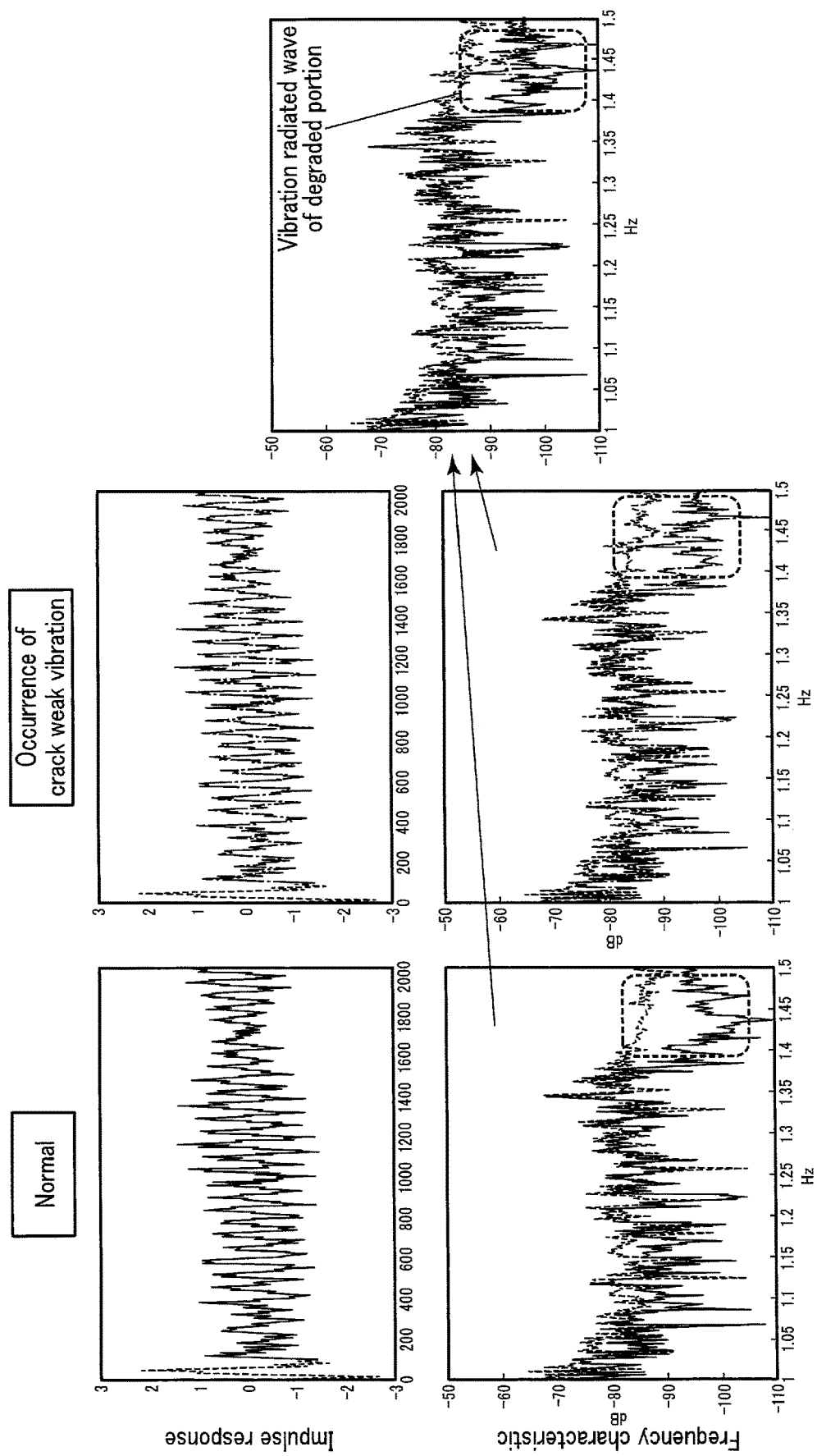
FIG. 10 shows examples of graphs obtained in an experiment to verify an effect according to the embodiment.

FIG. 10 shows examples of graphs obtained in an experiment to verify an effect according to the embodiment. To perform a verification experiment, an abnormal state weak vibration model that could not be measured by the laser sensor 107 but could be measured by the microphone 103 was created. This model was created by generating a simulation signal (weak vibration radiated sound) and adding this only to an actually measured microphone signal.

Using the above model, the laser sensor 107 obtained a vibration measurement signal and the microphone 103 obtained a sound pressure signal, thereby calculating an impulse response. By denoising the maximum peak component from the impulse response, a weak vibration buried in an acoustic vibration was reproduced. The signal band of the weak vibration increased by adding the simulation signal, and disappeared by stopping the vibration (simulated normal). This could confirm the operation principle of the measurement apparatus according to the embodiment.

Figure 11:
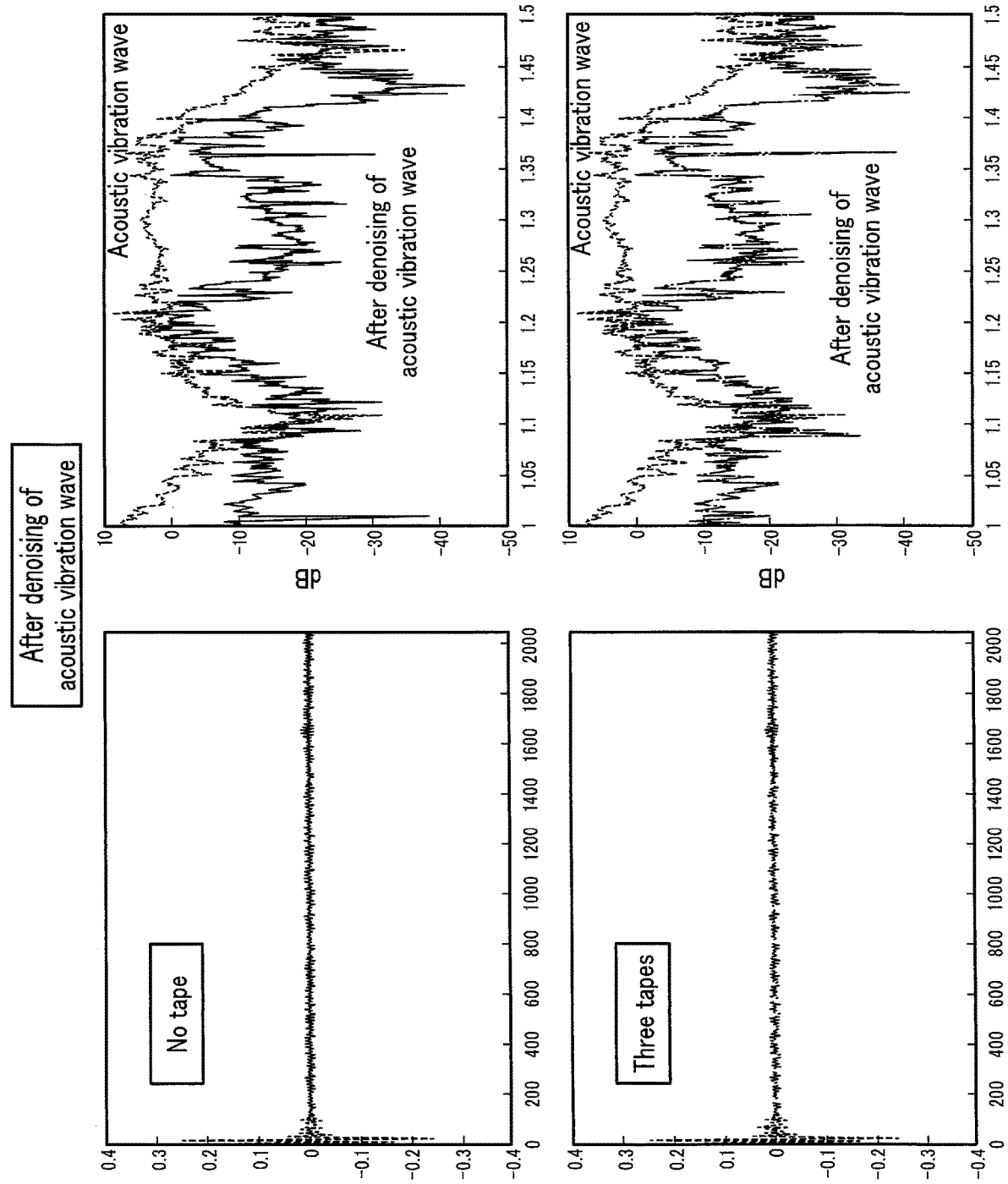
FIG. 11 shows other examples of the graphs obtained in the experiment to verify the effect according to the embodiment.
Figure 12:
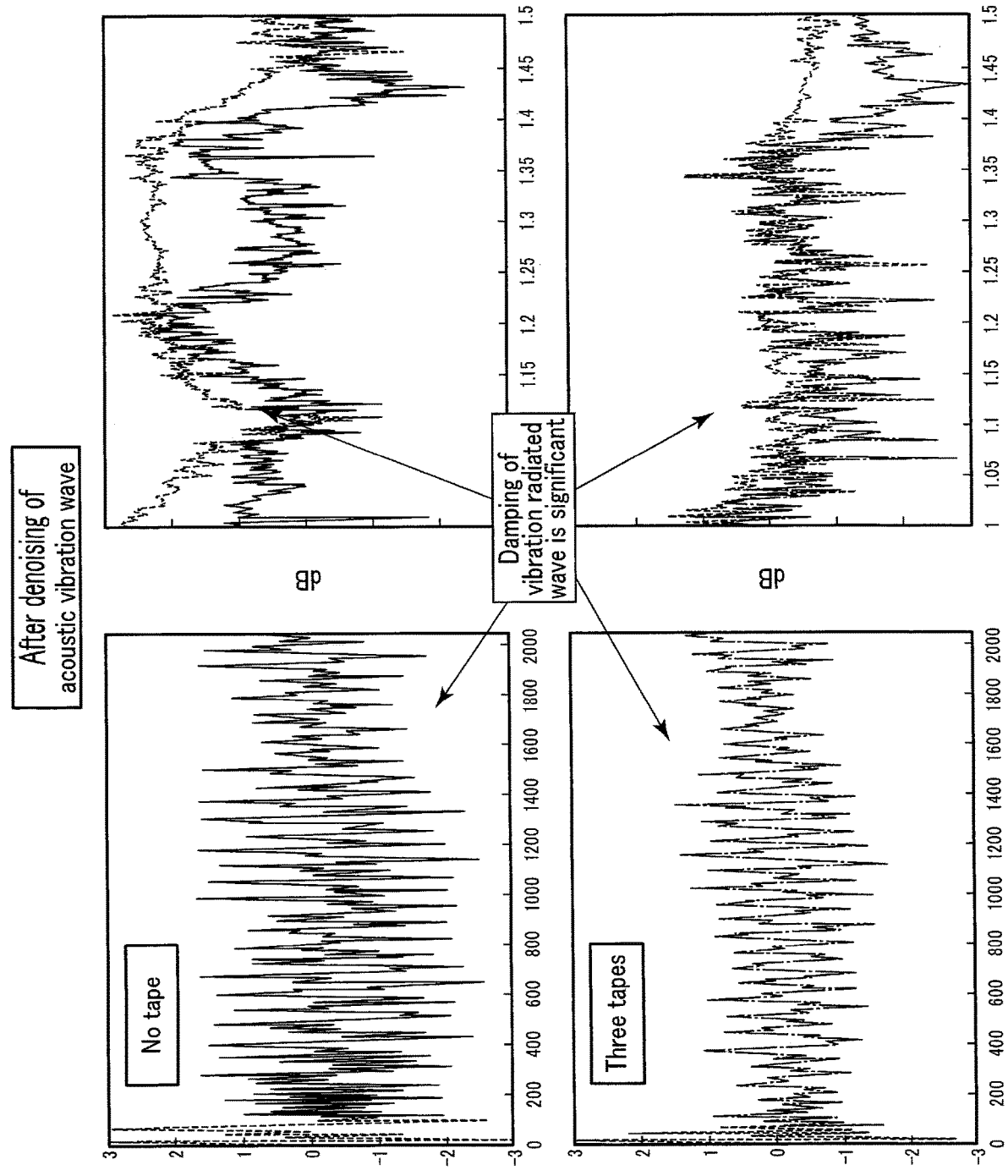
FIG. 12 shows other example of the graphs obtained in the experiment to verify the effect according to the embodiment.

FIGS. 11 and 12 show other examples of the graphs obtained in the experiment to verify the effect according to the embodiment. A ratio between the damping rate of the vibration field by measurement at one point by the laser sensor 107 and the damping rate of the occurred vibration field of the vibration radiated sound of the overall target object collected as a microphone sound pressure is reflected on the point-to-point impulse response of the microphone sound pressure with respect to the laser vibration. This was verified by sticking a tape to the rear surface of the inspection target object O and comparing the difference in vibration damping with respect to a case in which there was no tape.

FIG. 11 comparatively shows waveforms after denoising the vibration wave from the impulse response between two microphones in a case in which there is no tape and a case in which there are tapes (three tapes). The impulse response G is given by:

$$G = \frac{P_2}{P_1} = \frac{\frac{\rho j\omega\Delta S}{2\pi}\sum_{i=1}^{N} \frac{(j\omega(\varphi_n(xi)\varphi_n(\delta)f)/(m_n(2j\omega_n\omega\xi_p)))}{r2i}e^{-jkr2i}}{\frac{\rho j\omega\Delta S}{2\pi}\sum_{i=1}^{N} \frac{(j\omega(\varphi_n(xi)\varphi_n(\delta)f)/(m_n(2j\omega_n\omega\xi_p)))}{r1i}e^{-jkr1i}} \quad (14)$$

$$= \frac{\sum_{i=1}^{N}\frac{1}{r2i}e^{-jkr2i}}{\sum_{i=1}^{N}\frac{1}{r1i}e^{-jkr1i}}$$

The graphs in FIG. 11 indicate almost the same resonance frequency characteristics in both the cases, and it is difficult to find the difference. Therefore, it is impossible to clearly grasp the vibration radiated wave.

FIG. 12 comparatively shows waveforms after denoising the vibration wave from the point-to-point impulse response between the vibration measured by the laser sensor and the sound pressure collected by the microphone in a case in which there is no tape and a case in which there are tapes according to the embodiment.

When γ1 represents the ratio between the damping rates in the case in which there is no tape and G1 represents the impulse response, equation (15) below holds.

$$G1 = \frac{P_V}{v1} = U \cdot \gamma 1 \quad \gamma = \frac{\xi_V}{\xi_P} \quad (15)$$

When γ2 represents the ratio between the damping rates in the case in which there are tapes and G2 represents the impulse response, equation (16) below holds.

$$G2 = \frac{P_V}{v1} = U \cdot \gamma 2 \quad (16)$$

The graphs in FIG. 12 conspicuously indicate damping of the vibration radiated wave. It was thus possible to confirm the effectiveness of the method of analyzing the point-to-point impulse response between the laser sensor 107 and the microphone according to the embodiment. The impulse response G when the damping ratios depending on the presence/absence of the tapes are directly reflected on the waveform is given by:

$$G = \frac{G2}{G1} = \frac{\gamma 2}{\gamma 1} \quad (17)$$

As described above, according to the embodiment, the inspection apparatus for inspecting the abnormal state of an inspection target object acquires vibration information by measuring the vibration of the inspection target object by one laser sensor and vibration information by a radiated sound collected from the inspection target object using one microphone. This causes the presence/absence of a crack and the progress of the crack to appear as a change of a transfer function between the laser sensor and the microphone. Therefore, it is possible to determine the presence/absence of the crack and the degree of progress of the crack with the simple arrangement that uses only the laser sensor and the microphone.

It is possible to extract a weak vibration buried in a vibration wave by more strongly exciting a weak vibration by an acoustic vibration, measuring a spatial transfer function (impulse response) by two microphones, and denoising a vibration wave of a maximum peak component appearing in it. With this method, it is difficult to detect a change in damping when the entire target surface vibrates in a resonance mode like a plate resonance vibration.

On the other hand, there is provided a method of directly measuring, by a laser, a local change of a vibration portion caused by an abnormal state such as peeling. However, it is possible to only acquire vibration information of one point on the surface of the structure by the laser vibration. The microphone sound pressure has an advantage that all sounds emitted from the vibration portion of the overall target object can be recorded at one point but noise such as the influence of an external disturbance is also added when each sound is acquired individually. In particular, when detecting a weak vibration radiated sound, it is difficult to expect high accuracy unless denoising is performed.

To cope with this, in this embodiment, the whole target portion is vibrated by giving a vibration signal to the structure by the vibration unit (vibration sound source 101). Then, an acoustic vibration wave is denoised from the initial maximum peak of the impulse response calculated from the microphone sound pressure and the vibration at one point on the surface of the inspection target object obtained by the vibration sensor (laser sensor 107). This makes it possible to extract a buried weak vibration radiated sound, determine, from the frequency characteristic, the change of the vibration characteristic caused by degradation (reduction of an axial force, a crack, damping degradation, or the like) of the structure, and diagnose the abnormal state of the structure. This can complement useful vibration information that cannot be detected by the method using the two microphones.

In addition, as compared with the case in which it is necessary to strictly set the installation positions of the two microphones in the method using the two microphones, the positional relationship between the microphone 103 and the laser sensor 107 in the embodiment is not sensitive. This can further facilitate the operation procedure.

That is, the arrangement of the two microphones are decided based on the distance from the position of each divided element point of the weak vibration to the microphone and the volume velocity of each point. Even if the scale of the weak vibration is constant, the result changes depending on the distance between the weak vibration and the reference microphone. At the actual site, the occurrence scale and position of the weak vibration are unknown, and it is thus difficult to derive an optimum microphone interval.

To the contrary, in the embodiment, since it is possible to inspect the target object from data individually collected by the microphone and the laser sensor, it is unnecessary to consider the positions of the microphone and the laser sensor. Therefore, it is possible to eliminate the necessity of trial and error associated with the installation positions of the microphone and the laser sensor and the interval between them, thereby significantly simplifying the operation procedure. To improve the S/N ratio, the microphone is advantageously moved closer to the target object as much as possible. Since it is only necessary to simply move the microphone closer to the target object, the system design is simple.

Furthermore, the microphone tends to have a low measurement resolution in the vicinity of a weak vibration, as compared with the laser sensor. On the other hand, even if a weak vibration occurs at a position away from the installation position of the microphone, the laser sensor in front of the microphone can detect the weak vibration with a high S/N ratio. It is possible to detect the presence/absence of the weak vibration based on the information. That is, it is possible to detect the weak vibration at a position away from the microphone using the vibration sensor, and it can be expected to obtain a high measurement resolution, as compared with the method using a plurality of microphones.

<Real Time Processing>

Processing of calculating an impulse response in real time will now be described. For example, there is known an inspection vehicle for inspecting a road by emitting a search sound from a traveling vehicle to the road and collecting acoustic information including a reflected sound by a microphone. In this kind of technical field, a technique capable of calculating an impulse response in real time is highly demanded.

As processing of calculating an impulse response from two signals, an adaptive filter processing and mutual correlation processing are prominent. Among them, the mutual correlation processing is advantageous for real time processing.

Figure 13:
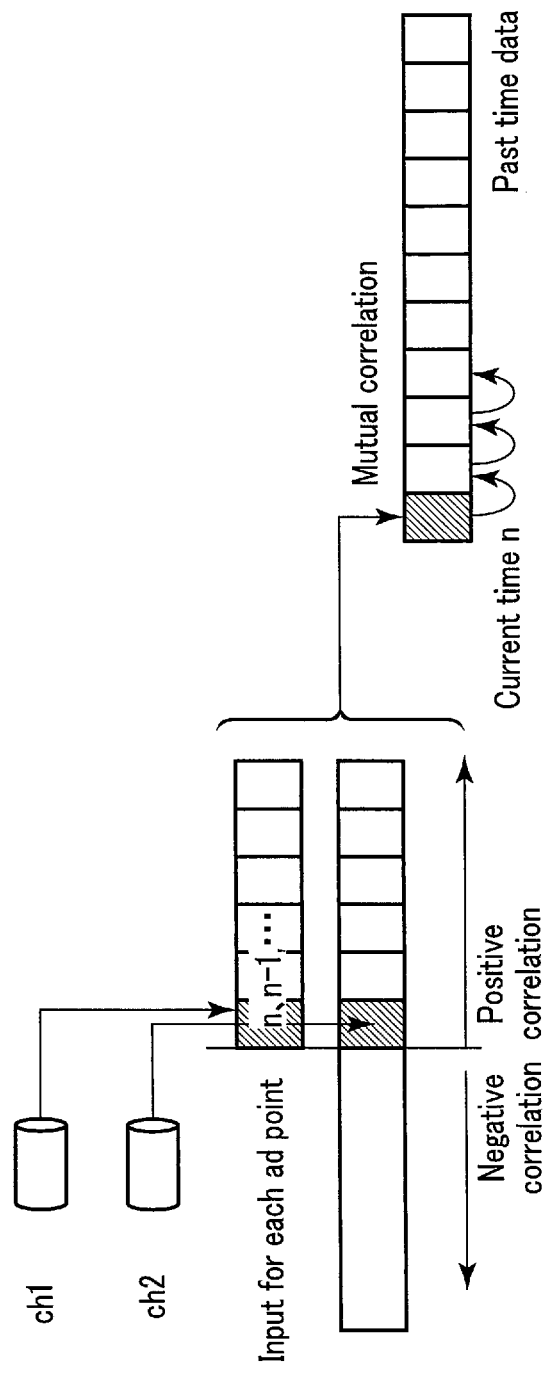
FIG. 13 is a view for explaining real time mutual correlation processing.

FIG. 13 is a view for explaining real time mutual correlation processing. Consider, for example, a case in which acoustic signals are collected using two microphones. Acoustic signals respectively sampled for AD points by a microphone of channel 1 (chi) and a microphone of channel 2 (ch2) are arrayed in time series (n, n–1, . . . ) and stored in a memory (not shown). Then, positive correlation data between the channels with reference to a current time n is acquired from data of the respective channels, thereby sequentially calculating mutual correlation in time series. With this processing, the mutual correlation output that changes over time along with the movement of each microphone is obtained, thereby making it possible to calculate an impulse response between the two signals in real time.

FIG. 14 is a timing chart showing an example of the impulse response obtained in real time. The impulse response includes the waveform of a vibration sound indicated by a dotted line and the waveform of a vibration radiated sound indicated by a one-dot dashed line. The waveform of the vibration sound includes the first peak and the second peak. The level of the first peak is given by a function of an interval between the microphone of channel 1 and that of channel 2. The appearance position of the second peak is given by a function of an interval between the inspection target object and the reference microphone (for example, the microphone closer to the inspection target object: channel 1) from the start point of the first peak.

In the real time processing, as indicated by a dotted-line rectangular region shown in FIG. 14, an interval from the start point of the first peak to the start point of the second peak is set as a processing target (detection window). As described in the embodiment with respect to this interval, denoising of an unnecessary component as the first peak is applied, thereby performing frequency analysis. With this processing, it is possible to perform, in real time, processing of detecting the presence/absence of an abnormal state by capturing a weak sound.

It is possible to similarly apply the mutual correlation processing even in a state in which the system is stopped, as a matter of course. That is, according to the embodiment, it is possible to provide an acoustic inspection technique that is applicable to both batch processing and real time processing by using mutual correlation processing.

Furthermore, the real time processing can be performed by applying mutual correlation processing not only to an impulse response obtained by two microphones but also to an impulse response obtained from pieces of information individually collected by the vibration sensor and the microphone. That is, the microphone and the vibration sensor can be regarded as the first sensor that outputs the first signal and the second sensor that outputs the second signal, respectively.

From the impulse response obtained by mutual correlation between the first signal and the second signal, an interval from the start point of the first peak to the start point of the second peak is set as a processing target. The first peak is obtained based on the interval between the first sensor and the second sensor, and the start point of the second peak is obtained based on a time width corresponding to the interval between the inspection target object and the reference sensor. Then, by performing frequency analysis of the impulse response waveform from which the first peak has been denoised, it is possible to implement real time nondestructive inspection regardless of the type of the sensor.

Note that the present invention is not limited to the above described embodiment. For example, as shown in FIG. 15, a hammering mechanism 108 that physically hammers the inspection target object O may be used instead of the vibration sound source 101 and the speaker 102 shown in FIG. 1. A contact type sensor 109 that is attached to the inspection target object O and collects the vibration of the inspection target object O may be used instead of the laser sensor 107. For example, it is possible to consider a usage example of packaging a small hammer, an acceleration sensor, a small microphone, and a small terminal and simulating hand carry measurement.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection apparatus comprising:
   a vibration sensor configured to detect a vibration of an inspection target object to which the vibration is excited;
   a microphone arranged near the inspection target object and configured to collect a radiated sound from the inspection target object; and
   a processor including hardware and configured to
   calculate an impulse response between the vibration sensor and the microphone based on the vibration detected by the vibration sensor and a sound pressure of the radiated sound collected by the microphone,
   denoise an unnecessary component from the impulse response,
   convert the impulse response, from which the unnecessary component has been denoised, into a frequency characteristic,
   calculate acoustic energy between the vibration sensor and the microphone based on the frequency characteristic, and
   determine the presence/absence of an abnormal state of the inspection target object based on the acoustic energy.

2. The inspection apparatus according to claim 1, wherein the processor is configured to calculate the impulse response with reference to the vibration.

3. The inspection apparatus according to claim 1, wherein the processor is configured to denoise a component of the impulse response corresponding to a time width according to an interval between the microphone and a vibration surface of the inspection target object.

4. The inspection apparatus according to claim 1, further comprising a vibration unit configured to excite a vibration to the inspection target object.

5. The inspection apparatus according to claim 4, wherein the vibration unit comprises a sound source configured to emit a vibration sound to the inspection target object.

6. The inspection apparatus according to claim 4, wherein the vibration unit comprises a hammering mechanism configured to hammer the inspection target object.

7. The inspection apparatus according to claim 1, wherein the vibration sensor comprises a noncontact vibration sensor configured to measure the vibration of the inspection target object based on a Doppler shift of a laser beam emitted to the inspection target object.

8. The inspection apparatus according to claim 1, wherein the vibration sensor comprises a contact type sensor attached to the inspection target object and configured to collect the vibration of the inspection target object.

9. An inspection method comprising:
   exciting, by a vibration unit, a vibration to an inspection target object;
   detecting, by a vibration sensor, the vibration of the inspection target object;
   collecting, by a microphone arranged near the inspection target object, a radiated sound from the inspection target object;
   calculating, by a processor, an impulse response between the vibration sensor and the microphone based on the vibration detected by the vibration sensor and a sound pressure of the radiated sound collected by the microphone;
   denoising, by the processor, an unnecessary component from the impulse response;
   converting, by the processor, the impulse response, from which the unnecessary component has been denoised, into a frequency characteristic;
   calculating, by the processor, acoustic energy between the vibration sensor and the microphone based on the frequency characteristic; and determining, by the processor, the presence/absence of an abnormal state of the inspection target object based on the acoustic energy.

* * * * *